US008076647B2

(12) United States Patent  
Danielsson et al.

(10) Patent No.: US 8,076,647 B2
(45) Date of Patent: Dec. 13, 2011

(54) X-RAY DETECTOR, A CORRESPONDING X-RAY IMAGING DEVICE AND A METHOD FOR IMPROVING THE RESOLUTION OF A SCINTILLATOR-BASED X-RAY DETECTOR

(75) Inventors: Mats Danielsson, Täby (SE); Sandra Tibbelin, Farsta (SE)

(73) Assignee: Matt Danielsson, Taby (SE)

( * ) Notice: Subject to any disclaimer, the term of this patent is extended or adjusted under 35 U.S.C. 154(b) by 483 days.

(21) Appl. No.: 12/255,096

(22) Filed: Oct. 21, 2008

(65) Prior Publication Data

US 2010/0096558 A1    Apr. 22, 2010

(51) Int. Cl.
 *G01T 1/20* (2006.01)
(52) U.S. Cl. .................................. 250/370.11
(58) Field of Classification Search ............. 250/370.11
 See application file for complete search history.

(56) References Cited

U.S. PATENT DOCUMENTS

| | | | |
|---|---|---|---|
| 5,912,942 A | 6/1999 | Shick et al. | |
| 7,173,251 B2 | 4/2004 | Fraser et al. | |
| 2004/0000630 A1* | 1/2004 | Spartiotis et al. | 250/208.1 |
| 2009/0050811 A1* | 2/2009 | Barrett et al. | 250/363.04 |
| 2009/0290779 A1* | 11/2009 | Knapp et al. | 382/132 |

OTHER PUBLICATIONS de Vree, G.A. et al. "Photon-Counting Gamma Camera Based on an Electron-Multiplying CCD" IEEE Transactions on Nuclear Science, vol. 52, No. 3 Jun. 2005 pp. 580-588.
Miller, B.W. et al. "Single-photon spatial and energy resolution enhancement of a columnar CSL(TI)/EMCCD gamma-camera using maximum-likelihood estimation" Medical Imaging 2006: Physics of Medical Imaging, Proceedings of SPIE vol. 6142, 61421T (2006).
Miyata, E. et al. "High Resolution X-Ray Photon-Counting Detector with Scintillator-Deposited Charge-Coupled Device" IEEE Transactions on Nuclear Science, vol. 53, No. 2 Apr. 2006 pp. 576-583.
Teo, B.K. et al. "Evaluation of a EMCCD Detector for Emission-Transmission Computed Tomography" 2005 IEEE Nuclear Science Symposium Conference Record pp. 3050-3054.

* cited by examiner

*Primary Examiner* — David Porta
*Assistant Examiner* — Mindy Vu
(74) *Attorney, Agent, or Firm* — Young & Thompson

(57) ABSTRACT

A device with high efficiency and high spatial resolution for detection of individual x-rays includes a detector for x-rays with energy exceeding 20 keV based on a columnar scintillator having a number of columns, and a semiconductor readout circuit coupled to the scintillator, where the detector is configured for providing a detector resolution that is independent of scintillator thickness. This may be accomplished by estimating a misalignment of the columns of the columnar scintillator with respect to the direction of incoming x-rays and either physically aligning the columns of the columnar scintillator to the direction of incoming x-rays or computationally correcting for the estimated misalignment.

13 Claims, 12 Drawing Sheets

X-RAY DETECTOR, A CORRESPONDING X-RAY IMAGING DEVICE AND A METHOD FOR IMPROVING THE RESOLUTION OF A SCINTILLATOR-BASED X-RAY DETECTOR

TECHNICAL FIELD

The present invention relates to an x-ray detector and corresponding x-ray imaging device, and especially a device for imaging single x-rays from radionuclide emissions.

BACKGROUND

In many applications there is a need for so-called Large Area Detection (LAD) of individual x-rays with high efficiency and high spatial resolution. Charge Coupled Devices (CCDs) are widely used together with a scintillator which converts the x-rays into visible light which can be detected by the CCD. The scintillator material can be for example Gd2O2S or CsI. CsI has the advantage that it can be grown in columnar form, the columns guiding the light in the right direction and reducing the light spread that occurs in a granular scintillator such as Gd2O2S. X-ray detecting devices can operate in different ways, for example by integrating the collected signal over a certain time period to produce an image. Another option is to detect each individual x-ray as a separate event.

Miyata et al. report a photon counting detector to be used as the focal plane of a space telescope. They use a columnar CsI scintillator directly coupled to a CCD for operation in a wide energy band. Low energy photons are directly absorbed in the CCD, while higher energy photons are first converted to visible light in the scintillator, and this visible light is in turn imaged by the CCD. It is however not possible to attain high efficiency simultaneously for all the different energies which can be detected with this device. They use the central pixel of a local maximum as the position of the interaction event, which limits the obtainable resolution depending on pixel size. The pixel size is in turn limited by the fact that smaller pixels mean the signal will be spread over a larger number of pixels and this means a lower value per pixel, which becomes increasingly difficult to distinguish from the noise for smaller pixel sizes.

To avoid the problem that the pixel size puts a severe limit on the spatial resolution, it is possible to estimate the position of interaction based on a centroid estimation of the pixels surrounding a local maximum. Miller et al. report an electron multiplying CCD (EMCCD) with columnar CsI scintillator used in photon counting mode. They perform centroid estimation on detected scintillation events to improve spatial resolution. The CCD images are background corrected and then thresholded slightly above noise level. Miller demonstrates that smoothing of the images prior to the thresholding is not necessary as is done by many others e.g. de Vree et al. and Teo et al. Contiguous regions of pixels above the noise level are identified as an event and centroid estimation is performed on a window around the identified event. While this procedure works well the use of a CCD will still suffer from challenges since the spatial resolution will drop if the efficiency is high using a thick scintillator and also the device will be impractical for low rate, large area applications since, at least in principle, the whole CCD has to be read out to identify events from x-rays, and the thresholding to remove noise is not integrated in the CCD itself but resides on external electronics.

Some of the drawbacks which come from the use of CCD's are outlined more in detail in U.S. Pat. No. 5,912,942, Schick et al. After the CCD has been exposed to the incident light, the pixels are read out in a process where only the pixels on the edge are read out, each capacitor then transfers its contents to its nearest neighbor and the readout process is repeated in this way until all of the pixels in the array have been read out. During this procedure all the CCD pixels are always read out, for large area detectors this produces unmanageable amounts of data. An alternative to a CCD is a CMOS circuit where, contrary to the CCD, each pixel is read out individually and it is therefore possible to employ triggers for events, noise suppression and other information processing. A CMOS circuit coupled to a CsI scintillator is therefore an advantageous solution, as disclosed in U.S. Pat. No. 7,173,251, Fraser et al.

In spite of the progress in the field the last decade there are still no commercial detectors combining semiconductor readout and a scintillator for x-ray conversion with typical resolution for single x-rays better than 50 µm in combination with high efficiency for x-rays with energy exceeding around 20 keV.

SUMMARY OF THE INVENTION

The present invention aims at solving the problems of the state of the art and removing the obstacles for x-ray detection and/or imaging applications with high resolution, high efficiency detectors based on a semiconductor readout and a scintillator for x-ray conversion. Another optional extension of the present invention makes it possible to handle large data samples.

Briefly, the invention provides a detector for x-rays with energy exceeding 20 keV that is based on a columnar scintillator having a number of columns, and a semiconductor readout circuit coupled to the scintillator, where the detector is configured for providing a detector resolution that is independent of scintillator thickness.

In a first example, the thickness-independent resolution of the detector is achieved by estimating a misalignment of the columns of the columnar scintillator with respect to the direction of incoming x-rays and then aligning the columns of the columnar scintillator to the direction of incoming x-rays. For example, this can be accomplished by mechanical means such as positioning blocks for tilting the columnar scintillator and associated semiconductor readout circuit so that the columns of the columnar scintillator are aligned with the direction of the incoming x-rays.

In a second alternative example, the thickness-independent resolution of the detector is achieved by providing means for estimating a misalignment of the columns of the columnar scintillator with respect to the direction of incoming x-rays, and (instead of physically aligning the detector) computationally correcting for the estimated misalignment. For example, this can be accomplished by using a collimated laser beam or other source of photons with lower energy than x-ray to estimate the misalignment. Alternatively, the estimation of the misalignment is performed by using the pixel response of the x-ray detector. Preferably, although not necessarily, the estimation of misalignment and the correction of the estimated misalignment are implemented in a suitable software/hardware combination such as software for execution by suitable processing hardware.

In another aspect of the invention, there is provided an x-ray imaging system having an x-ray detector with scintillator-thickness independent resolution.

Yet another aspect of the invention relates to a method of improving the resolution of a scintillator-based x-ray detector.

DESCRIPTION OF EXEMPLARY EMBODIMENTS

In the following, the present invention will be described with reference to exemplary and non-limiting embodiments of a new x-ray detector, corresponding x-ray imaging device and method for improving the resolution of such a detector.

The inventors have made a careful analysis of the state-of-the-art with respect to x-ray detectors and realized that one of the reasons why there are no commercial detectors combining semiconductor readout and a scintillator for 20 KeV energies or higher is that in order to achieve high efficiency in this energy range a thick scintillator of the order of 0.5 mm is required and the columns in the scintillator such as a CsI scintillator most often end up as misaligned compared to the incoming x-rays (FIG. 3), which will deteriorate the spatial resolution.

A basic idea of the present invention is to provide an x-ray detector for 20 KeV energies in a detector configuration that provides a high detector resolution independent of scintillator thickness.

This may for example be accomplished by estimating the misalignment of the columns of the columnar scintillator with respect to the direction of incoming x-rays and then aligning the columns of the columnar scintillator to the direction of incoming x-rays. As an example, the alignment can be accomplished by mechanical means such as positioning blocks for tilting the columnar scintillator and associated semiconductor readout circuit so that the columns of the columnar scintillator are aligned with the direction of the incoming x-rays.

In another example, the thickness-independent resolution of the detector is achieved by providing means for estimating the misalignment, and (instead of physically aligning the detector) computationally correcting for the estimated misalignment.

Figure 1:
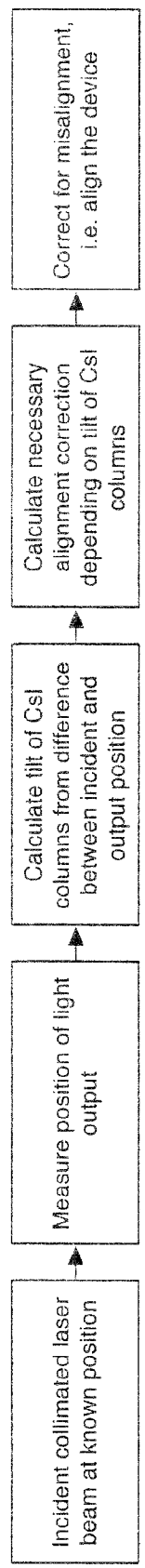
FIG. 1 is a schematic flow diagram illustrating an example of alignment of an x-ray detector according to an exemplary embodiment of the invention.

FIG. 1 is a schematic flow diagram illustrating an example of misalignment correction of an x-ray detector according to an exemplary embodiment of the invention. In this exemplary embodiment, the misalignment correction process includes a number of steps, first to measure the column tilt of the scintillator and thereafter to calculate the necessary alignment correction and finally to carry out the correction for misalignment, i.e. align the device.

Figure 2:
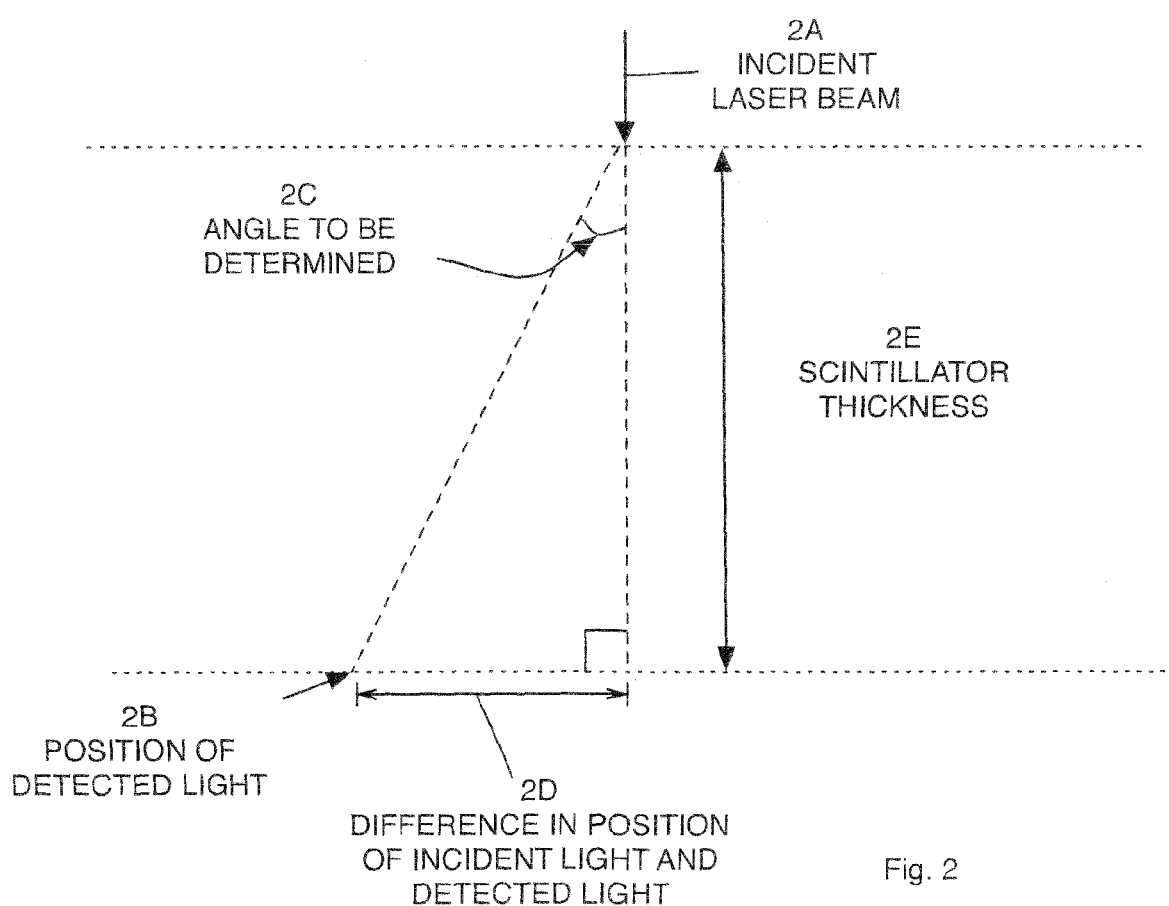
FIG. 2 shows a method to measure the tilt of the scintillator columns.

A specific exemplary embodiment of the present invention involves a method for measurement of the column tilt wherein a laser beam or other source of photons with lower energy than the x-rays is incident on the scintillator at a known position according to the arrow 2A in FIG. 2. The position of the scintillator and semiconductor unit is also known. The position of the detected light output from the scintillator, 2B, such as a CsI scintillator is then measured and the angle of the tilt of the (CsI) columns, 2C, can then be calculated from the difference in position, 2D, of the incident laser beam and the measured position of the light output from the (CsI) scintillator. The laser beam or other photon source can be applied in one or several different positions, if applied in several different positions a value of the angle, 2C, can be calculated for each one and then the average value of these is calculated. The angle, 2C, is determined from the position shift, 2D, and known scintillator thickness, 2E, from the following:

$$\tan(\text{angle}) = \text{position shift/thickness}.$$

Figure 3:
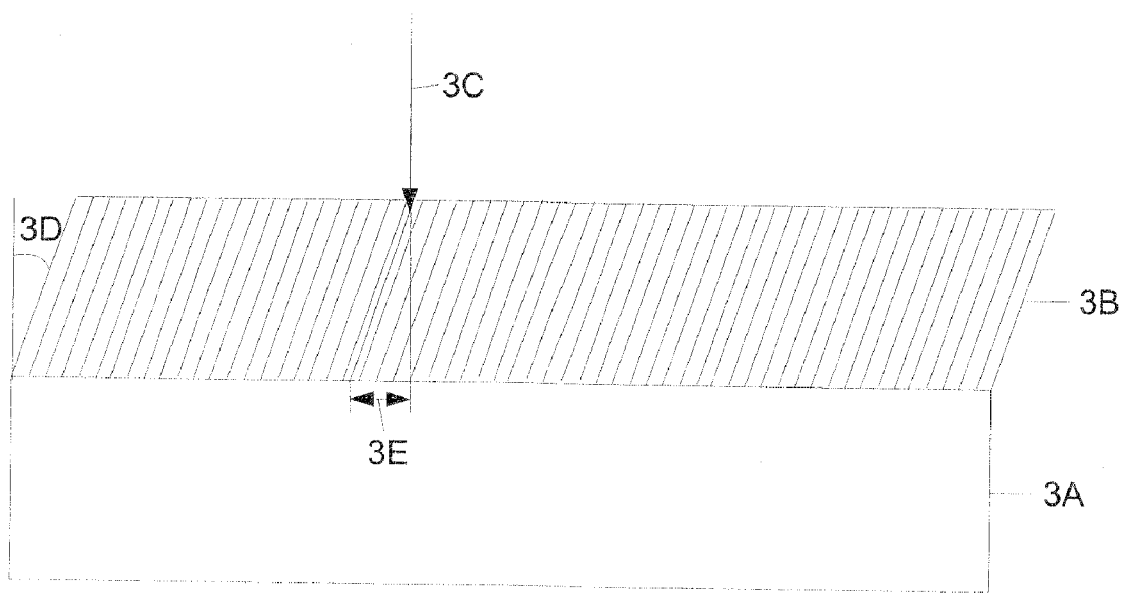
FIG. 3 shows an example of how the scintillator columns are tilted which causes a position shift of the light output.
Figure 4:
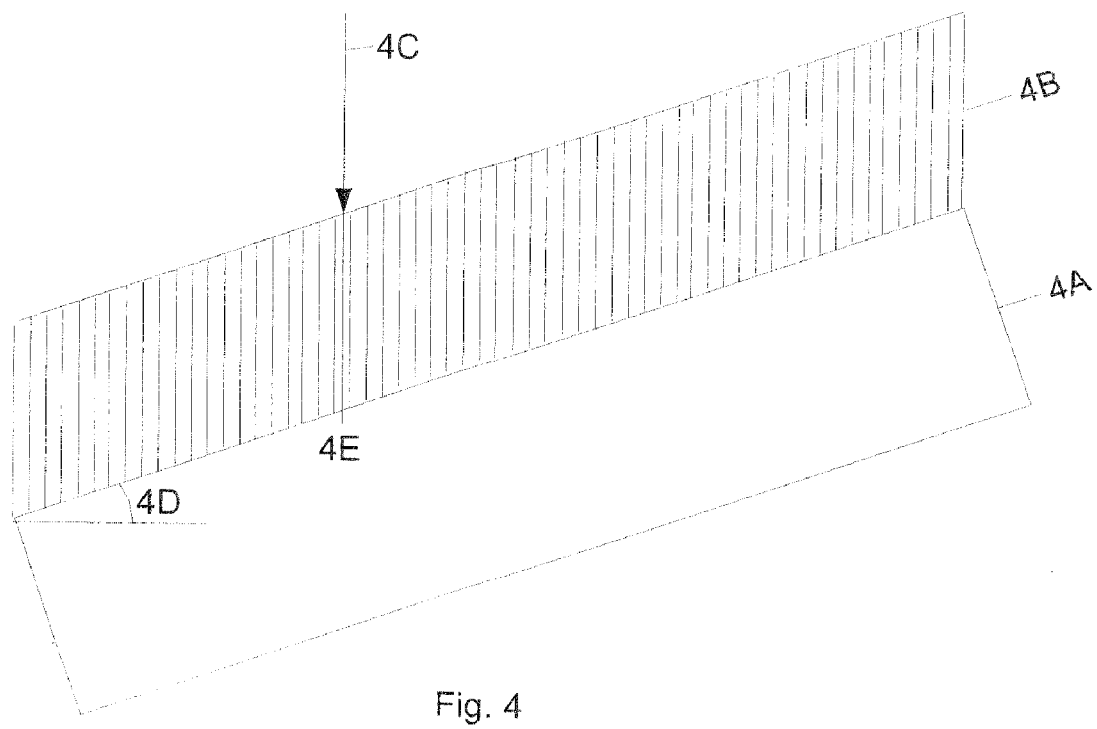
FIG. 4 shows an example of an alignment corrected device.

This is also illustrated in FIGS. 3 and 4. FIG. 3 shows a semiconductor readout unit such as a CMOS circuit 3A with the columnar scintillator 3B. X-rays are incident upon the scintillator perpendicular to the surface as illustrated by the arrow 3C. Because the columns of the scintillator are tilted by angle 3D, light output from x-rays which interact with the scintillator near the opposite side of the scintillator to the detector, will be shifted a distance 3E along the direction of the tilt. Said position shift of emitted light photons is present for x-ray conversions at all depths in the scintillator, but decreases in length for conversions located closer to the detector. FIG. 4 shows an embodiment of the present invention wherein the detector is alignment corrected. This alignment correction includes a rotation of the detector by an angle 4D, which is equal to the tilt of the columns, angle 3D illustrated in FIG. 3. According to FIG. 4 for an alignment corrected detector 4A with columnar scintillator 4B, light output from x-ray interactions with the scintillator from x-rays incident on the detector along the direction specified by arrow 4C will be located at a position 4E which coincides with the direction of the x-rays. This results in the elimination of above-mentioned position shift 3E shown in FIG. 3.

Figure 5:
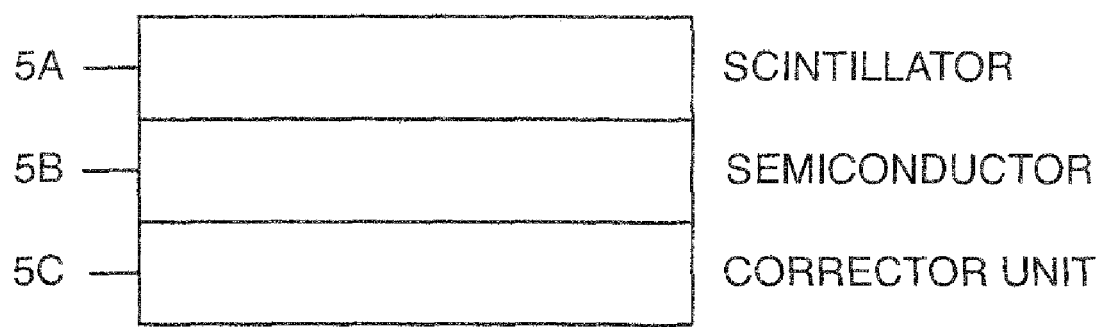
FIG. 5 is a schematic block diagram of an x-ray detector according to an exemplary embodiment of the invention.

FIG. 5 is a schematic block diagram of an x-ray detector according to an exemplary embodiment of the invention. In this exemplary embodiment, the overall x-ray detector comprises a scintillator 5A, a semiconductor readout device 5B and a misalignment corrector unit 5C. The semiconductor readout device 5B for example comprises electronics based on CCD or CMOS technology, and the columnar scintillator 5A may be a CsI scintillator. The misalignment corrector unit 5C may include mechanical means, such as positioning blocks or equivalent means, to hold the scintillator and semiconductor unit in the alignment corrected position.

Alternatively, the corrector unit 5C is a device that estimates the misalignment and computationally corrects for the estimated misalignment.

Figure 6:
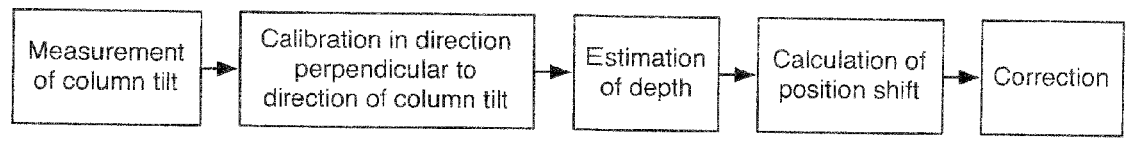
FIG. 6 is a schematic flow diagram illustrating an example of a method for alignment correction according to an exemplary embodiment of the invention.
Figure 7:
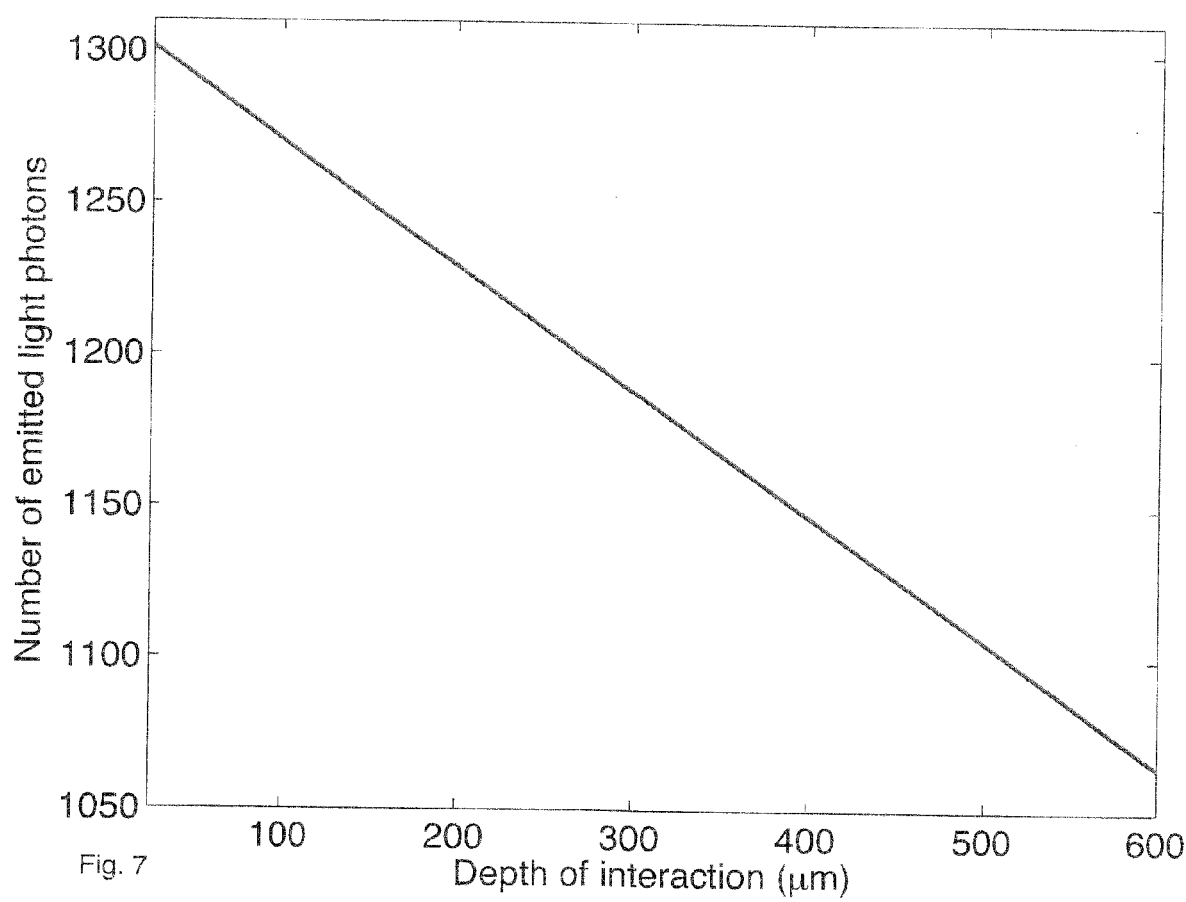
FIG. 7 shows how the number of detected photons is proportional to the depth of interaction.
Figure 8:
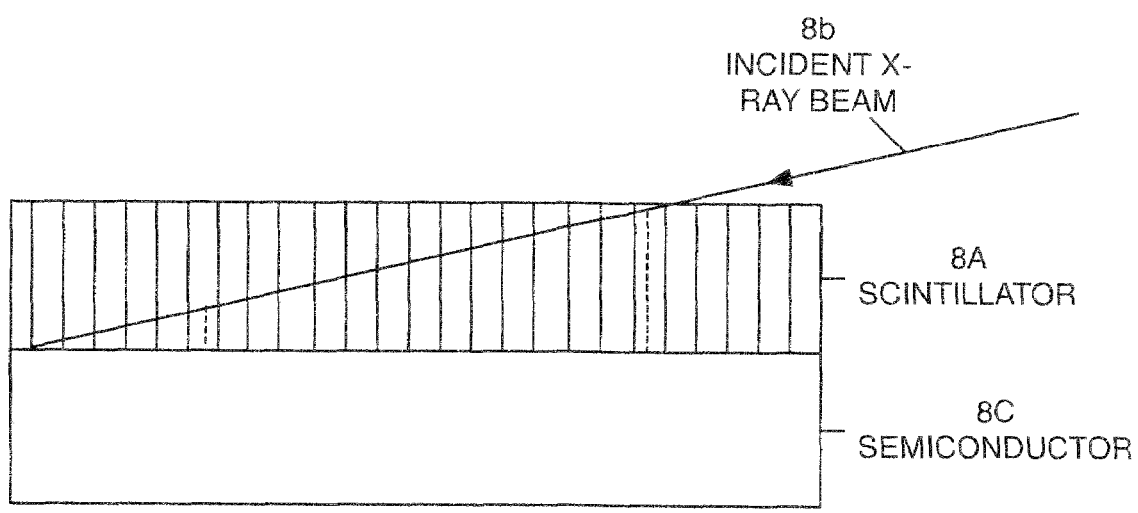
FIG. 8 is an illustration of the calibration procedure which is necessary for an exemplary embodiment of the invention.

An example of such a solution is illustrated in the schematic flow diagram of FIG. 6. This example utilizes the fact that the number of emitted light photons from a CsI scintillator is proportional to the depth of interaction of the x-ray within the scintillator as is shown in FIG. 7. An exemplary alignment correction method, which is suitable for software-implementation (including execution by a processor), comprises a calibration step where the number of detected light photons for different depths of interaction are sampled. First the column tilt is measured and thereafter the calibration is performed as illustrated by FIG. 8 in a direction perpendicular to the column tilt. In this direction the columns are straight and the use of a tilted x-ray beam means that the depth of a detected x-ray interaction is known from the position of the light output from said x-ray interaction. The total number of detected photons is calculated by summing over several pixels. This is performed for many x-ray interactions at different depths and the depth of interaction is stored as a function of the total number of detected photons from the interaction event.

Once the calibration step has been performed, the depth of interaction of an individual x-ray event can be estimated by summing the same number of pixels as was done in the calibration step to obtain the total number of detected photons from said x-ray interaction event, and looking up the corresponding depth of interaction which is known from the calibration step. The estimated depth of interaction is then in turn used to calculate the magnitude of the position shift which has occurred for said x-ray interaction event using the following:

position shift=depth of interaction·tan(angle).

The angle is known from the tilt of the CsI columns, which was measured prior to the calibration step. Once the position shift which has occurred is known it can be corrected for by subtracting it from the detected position for the x-ray interaction event.

A further improvement to the abovementioned exemplary alignment correction method is to use a Maximum-Likelihood (ML) method for the estimation of the depth of interaction. When using a ML method the probability distribution for the depth of interaction is also considered, this is a known exponential function, the probability of an interaction taking place is larger when the x-rays enter the scintillator and then decreases the longer they travel in the scintillator. The depth with the maximum probability is calculated considering both the probability depending on the number of detected photons and the probability for an interaction to occur at that depth. This could improve the accuracy of the depth of interaction estimation and subsequently the calculation of the position shift and misalignment correction.

Said alignment correction could also be used to correct a parallax error, which arises because x-rays from a point source which hit the edge of the detector have a slightly different angle of incidence compared to those which hit the center of the detector, because of the columnar structure of the scintillator this causes the same type of position shift of the light output. In the same way as described above the depth of interaction of an individual x-ray interaction event can be estimated and from this the position shift which has occurred can be calculated. The correction can then be performed as described above by the subtraction of this position shift.

The above steps and/or functions can for example be implemented as software for execution by suitable processor hardware (such as any conventional computer processor or digital signal processor or equivalent processing unit) in connection with an x-ray detector, and should thus be construed as special processor hardware when installed with the alignment correction software. It should though be understood that any suitable implementation, including hardware and a combination of hardware/software, is possible.

Figure 9A:
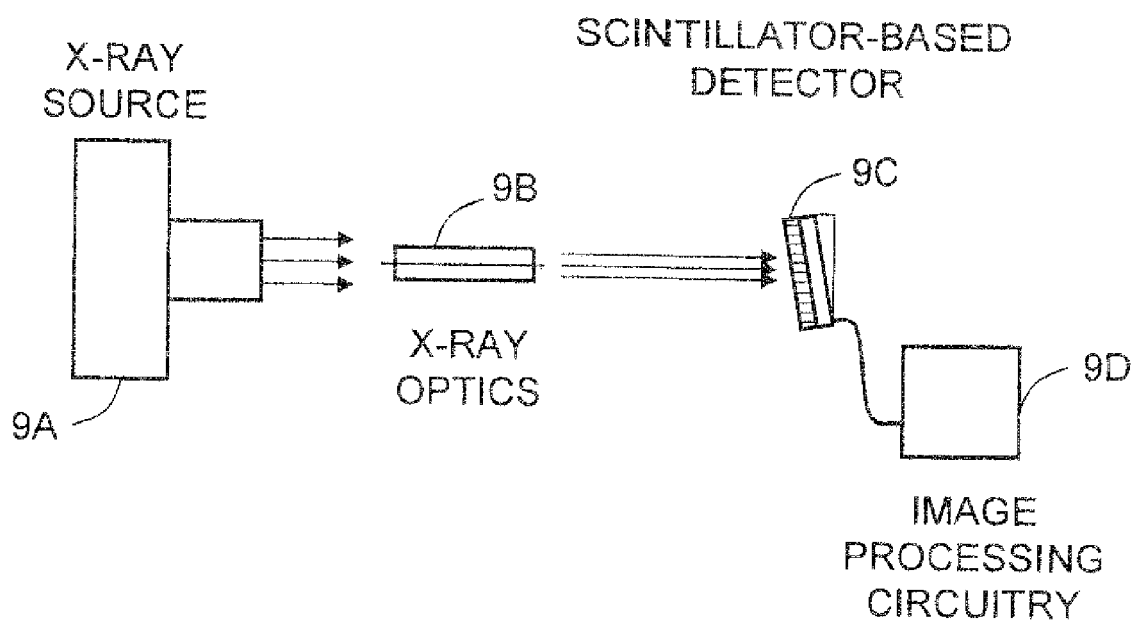
FIG. 9A is a schematic block diagram illustrating an example of an x-ray imaging device comprising an x-ray source and an x-ray detector of an exemplary embodiment of the present invention.

FIG. 9A is a schematic block diagram illustrating an example of an x-ray imaging device comprising an x-ray source and an x-ray detector of an exemplary embodiment of the present invention. The x-ray imaging device basically comprises an x-ray source 9A, suitable x-ray optics 9B and an x-ray detector 9C as described above. In general, the detector 9C is configured for registering radiation from the x-ray source that may have been focused by the x-ray optics and having passed an object to be imaged. The detector 9C is preferably connectable to image processing circuitry 9D to obtain a useful image. The imaging system may for example be used for medical imaging, e.g. to obtain diagnostic images. The x-ray detector 9C is based on a columnar scintillator such as a CsI scintillator coupled to a semiconductor read-out circuit such as a CMOS or CCD circuit. The x-ray detector is configured to provide a resolution that is independent of the scintillator thickness. In the example of FIG. 9A, the x-ray detector 9C is equipped with suitable mechanical means for physically aligning the columns of the columnar scintillator to the direction of the incoming x-rays. In practice, this means that the entire detector is positioned in an alignment-corrected way, for example by using positioning blocks for tilting the columnar scintillator and associated semiconductor readout circuit so that the columns of the columnar scintillator are aligned with the direction of the incoming x-rays.

Figure 9B:
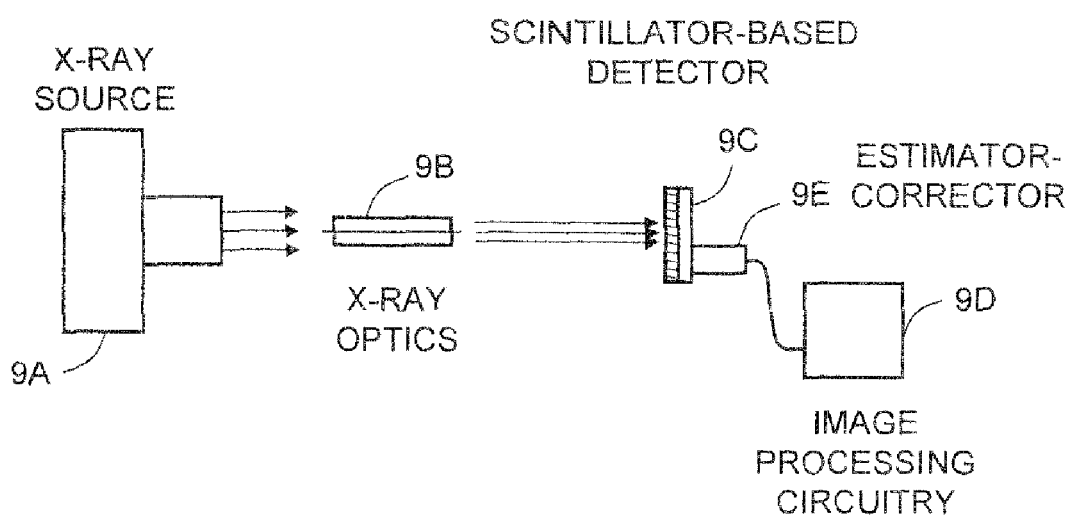
FIG. 9B is a schematic block diagram illustrating an example of an x-ray imaging device comprising an x-ray source and an x-ray detector of another exemplary embodiment of the present invention.

FIG. 9B is a schematic block diagram illustrating an example of an x-ray imaging device comprising an x-ray source and an x-ray detector of another exemplary embodiment of the present invention. In similarity to the example of FIG. 9A, the x-ray imaging device of FIG. 9B basically comprises an x-ray source 9A, suitable x-ray optics 9B and an x-ray detector 9C. In the example of FIG. 9B, the detector 9C includes or is associated with a misalignment estimator and corrector 9E. The detector 9C with its corrector unit 9E is preferably connectable to image processing circuitry 9D to obtain a useful image. As before, the x-ray detector 9C is based on a columnar scintillator coupled to a semiconductor read-out circuit. The x-ray detector is configured to provide a resolution that is independent of the scintillator thickness by means of the corrector unit 9E, which estimates a misalignment and computationally corrects for the estimated misalignment in any of the ways previously described.

The different embodiments of the invention outlined above may be combined and e.g. if the hardware correction does not work to eliminate all of the alignment error also a software correction can be applied afterwards.

A problem with present detectors in applications for low rate imaging of radio nuclides is the very large number of pixels corresponding to large amounts of data, most of which will be noise, not having any information about real x-ray photon hits. This is particularly serious since every pixel normally has to be read out quite frequently in order to avoid building up noise in the form of dark current.

Figure 10:
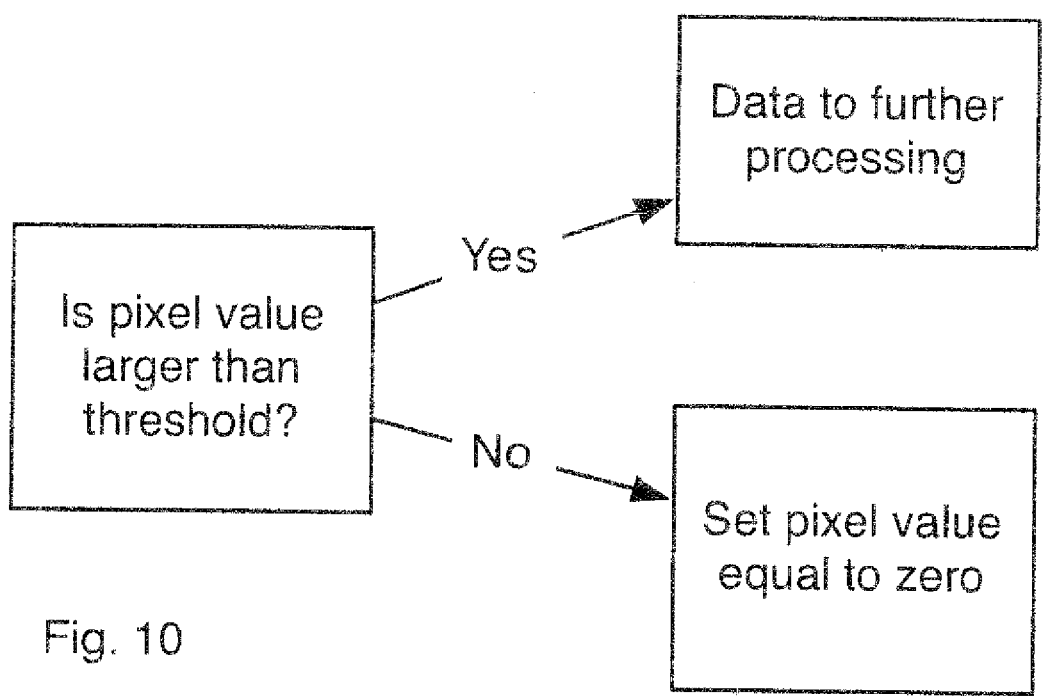
FIG. 10 is a schematic flow diagram illustrating an example of a method for zero-suppression according to an exemplary embodiment of the invention.
Figure 11:
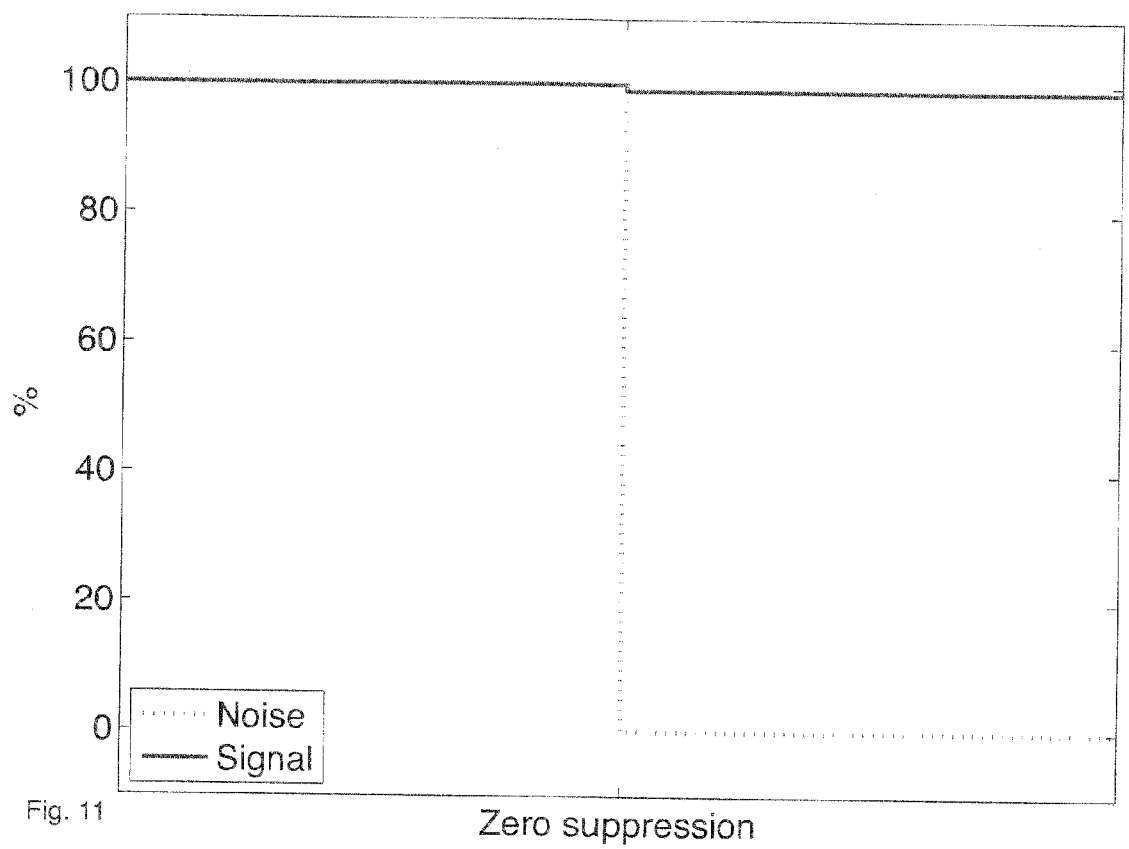
FIG. 11 shows how the zero suppression can reduce the amount of information, without destroying the signal.

FIG. 10 is a schematic flow diagram illustrating an example of a method for zero-suppression according to an exemplary embodiment of the invention. In this optional extension, a reduction in overall information size of pixel data from the x-ray detector is obtained through a zero suppression threshold procedure in the detector. The zero suppression is preferably performed on chip (in the detector) prior to data readout and signal processing, or by a special zero suppression circuit connected to the semiconductor read-out unit of the detector. The zero suppression may be implemented in hardware or any suitable software/hardware combination such as a specially programmed digital signal processor (DSP). The amount of information due to noise can thus be reduced, while keeping the signal information mostly intact. Each pixel value is compared to the threshold value, if the pixel value is lower than the threshold it is set to zero and suppressed, if the pixel value is higher than the threshold it remains unchanged. FIG. 11 shows how the zero suppression can reduce the amount of information, without destroying the signal. Prior to zero suppression both the noise and signal are at 100%, at the application of the zero suppression threshold the noise is effectively reduced while the signal remains almost completely intact.

The embodiments described above are merely given as examples, and it should be understood that the present invention is not limited thereto. Further modifications, changes and improvements which retain the basic underlying principles disclosed and claimed herein are within the scope of the invention.

REFERENCES

US Patent application 20060145083 Miyata et. al.
U.S. Pat. No. 7,173,251 Fraser et. al.
U.S. Pat. No. 5,912,942 Schick et. al.
Miyata et. al: High Resolution X-Ray Photon-Counting Detector With Scintillator-Deposited Charge-Coupled Device, IEEE Trans. Nucl. Sci. vol. 40, no. 2, page 576-583, April 2006
Miller et. al: Single-photon spatial and energy resolution enhancement of a columnar CsI(Tl) EMCCD gamma-camera using maximum-likelihood estimation, Proc. of SPIE Vol. 6142 (2006)
de Vree et. al: Photon-Counting Gamma Camera Based on an Electron-Multiplying CCD, IEEE Trans. on Nucl. Sci., vol. 52, no. 3, pp. 580-588, 2005.
Teo, et. al: Evaluation of a EMCCD Detector for Emission-Transmission Computed Tomography, IEEE NSS/MIC Conf. Rec., Paper J04-3, pp. 3050-3054.

The invention claimed is:

1. An x-ray imaging system comprising:
an x-ray source;
x-ray optics configured for operation with said x-ray source and for focusing radiation from said x-ray source;
an x-ray detector configured for registering radiation from said x-ray source that has been focused by said x-ray optics and has passed an object to be imaged, wherein said x-ray detector comprises:
a columnar scintillator having a number of columns;
a semiconductor readout circuit directly coupled to said columnar scintillator; and
means for providing a detector resolution that is independent of scintillator thickness.

2. The x-ray imaging system according to claim 1, wherein said means for providing a detector resolution that is independent of scintillator thickness comprises means for aligning the columns of the columnar scintillator to the direction of incoming x-rays.

3. The x-ray imaging system according to claim 2, wherein said means for aligning comprises mechanical means such as positioning blocks for tilting the columnar scintillator and associated semiconductor readout circuit so that the columns of the columnar scintillator are aligned with the direction of the incoming x-rays.

4. The x-ray imaging system according to claim 1, wherein said means for providing a detector resolution that is independent of scintillator thickness comprises:
means for estimating a misalignment of columns of the columnar scintillator with respect to the direction of incoming x-rays; and
means for correcting for the estimated misalignment.

5. The x-ray imaging system according to claim 4, wherein said means for estimating a misalignment of columns of the columnar scintillator is configured to operate based on pixel response of a detected x-ray from said detector, wherein said means for estimating a misalignment and said means for correcting for the estimated misalignment comprises processing hardware for executing software implementing i) estimation of misalignment based on pixel response and ii) correction of the estimated misalignment.

6. The x-ray imaging system according to claim 4, wherein said detector further comprises means for correcting for a parallax error.

7. The x-ray imaging system according to claim 1, wherein said semiconductor readout comprises electronics based on CCD or CMOS technology, and said columnar scintillator is a CsI scintillator.

8. The x-ray imaging system according to claim 1, further comprising image processing circuitry coupled to said x-ray detector.

9. The x-ray imaging system according to claim 1, further comprising circuitry for applying zero suppression to reduce the overall information size of pixel data from the x-ray detector.

10. A method of improving the resolution of an x-ray detector having a columnar scintillator and a semiconductor readout circuit coupled to said columnar scintillator, said method comprising the steps of:
estimating a misalignment of the columns of the columnar scintillator with respect to the direction of incoming x-rays; and
correcting for the estimated misalignment,
wherein said step of estimating a misalignment comprises the step of using a laser, diode or other source of photons with lower energy than x-ray to determine the required shift in position of the x-ray detector to correct for the misalignment.

11. The method according to claim 10, wherein said step of correcting for the estimated misalignment comprises the step of aligning the columns of the columnar scintillator to the direction of incoming x-rays.

12. The method according to claim 11, wherein said step of aligning the columns of the columnar scintillator to the direction of incoming x-rays comprises the step of adjusting the x-ray detector and thus the angle of the columns of the columnar scintillator.

13. An x-ray imaging system comprising:
an x-ray source configured for producing radiation in the form of x-rays;
x-ray optics configured for focusing the radiation from said x-ray source, and arranged before an object to be imaged so that the focused x-ray radiation passes the object to be imaged;
an x-ray detector arranged after the object to be imaged and configured for registering the focused radiation from said x-ray optics that has passed the object to be imaged, wherein said x-ray detector comprises:
a columnar scintillator having a number of columns;
a semiconductor readout circuit directly coupled to said columnar scintillator; and
means for providing a detector resolution that is independent of scintillator thickness.

* * * * *

UNITED STATES PATENT AND TRADEMARK OFFICE
CERTIFICATE OF CORRECTION

| | | |
|---|---|---|
| PATENT NO. | : 8,076,647 B2 | Page 1 of 1 |
| APPLICATION NO. | : 12/255096 | |
| DATED | : December 13, 2011 | |
| INVENTOR(S) | : Mats Danielsson et al. | |

It is certified that error appears in the above-identified patent and that said Letters Patent is hereby corrected as shown below:

On the title page, please amend Item (73) to read as follows:

-- (73) Assignee: Mats Danielsson, Taby (SE) --

Signed and Sealed this

Thirty-first Day of January, 2012

David J. Kappos
*Director of the United States Patent and Trademark Office*